United States Patent [19]
Oshikawa

[11] Patent Number: 5,273,475
[45] Date of Patent: Dec. 28, 1993

[54] METHOD FOR MANUFACTURING LIQUID CRYSTAL DISPLAY PANEL

[75] Inventor: Yasuo Oshikawa, Akishima, Japan

[73] Assignee: Casio Computer Co., Ltd., Tokyo, Japan

[21] Appl. No.: 967,286

[22] Filed: Oct. 27, 1992

[30] Foreign Application Priority Data

Nov. 1, 1991 [JP] Japan ................. 3-313476

[51] Int. Cl.$^5$ .................... B23P 11/02; H01J 9/26
[52] U.S. Cl. ......................... 445/24; 445/25; 156/163; 29/447
[58] Field of Search ............ 445/24, 25; 156/160, 156/163; 29/447

[56] References Cited

U.S. PATENT DOCUMENTS

| | | | |
|---|---|---|---|
| 2,039,398 | 5/1936 | Dye | 29/447 |
| 3,402,873 | 9/1968 | Lauterbach, Jr. | 156/160 |
| 5,178,571 | 1/1993 | Mase | 445/24 |

OTHER PUBLICATIONS

A. B. Fowler, "Precurved Glass Plates..." *IBM Tech. Disc. Bull.*, vol. 19, No. 4, Sep. 1976, p. 1476.

Primary Examiner—Richard K. Seidel
Assistant Examiner—Jeffrey T. Knapp
Attorney, Agent, or Firm—Frishauf, Holtz, Goodman & Woodward

[57] ABSTRACT

In a liquid crystal display panel manufacturing method, before two substrates of the display panel are adhered to each other, one of the substrates is subjected to thermal expansion, and after adhesion, the other substrate is subjected to thermal expansion so that the first and second substrates are curved, thereby obtaining a liquid crystal display panel the display surface of which is curved. The liquid crystal display panel manufactured by the above method is relatively low in cost. Further, since the two substrates are not curved forcibly, the gap therebetween is uniform over the entirety of the display surface, ensuring high display quality.

23 Claims, 2 Drawing Sheets

METHOD FOR MANUFACTURING LIQUID CRYSTAL DISPLAY PANEL

BACKGROUND OF THE INVENTION

1. Field of the Invention

The present invention relates to a method for manufacturing a liquid crystal display panel having a curved display surface.

2. Description of the Related Art

According to a known method for manufacturing a liquid crystal display panel having a curved display surface, a liquid crystal display panel is formed as a flat plate by using two flexible substrates made of plastic, after which it is adhered to a curved surface, i.e. an outwardly curved surface of a base member, such that it extends over the curved surface.

Since the liquid crystal display panel manufactured by such a method requires that a base member having a curved surface be employed in order to make the display surface curved, this results in a high manufacturing cost.

Further, since the liquid crystal display panel is forcibly curved by an external force generated as a result of the adhesion of the display panel initially in the form of a flat plate to the curved surface of the base member, the gap between the two substrates of the panel becomes undesirably narrow at the central region of the display surface of the panel, resulting in degradation of display quality.

SUMMARY OF THE INVENTION

The present invention has been conceived in consideration of the above circumstances, and the object thereof is to provide a method for manufacturing a liquid crystal display panel having a curved display surface, without the need for a base member having a curved surface, thereby to realize a lower manufacturing cost, and wherein the gap between two substrates is uniform over the entirety of the display panel, thus ensuring high display quality.

According to the present invention, there is provided a method for manufacturing a liquid crystal display panel which comprises the steps of preparing first and second plastic substrates, subjecting the first substrate to thermal expansion, arranging a sealing member on a peripheral portion of at least one of the first and second substrates, adhering the first and second substrates to each other, with the sealing member interposed therebetween, subjecting the second substrate to thermal expansion, and providing liquid crystal between the first and second substrates.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIGS. 1 to 5 show one embodiment of the present invention, in which:

FIG. 1 is a cross-sectional view of a liquid crystal display panel manufactured by the method of the present invention;

FIG. 2 is a cross-sectional view of one substrate having a surface on which a plurality of spacers are arranged;

FIG. 3 is a cross-sectional view of the substrate of FIG. 2, shown in a state of expansion due to heating;

FIG. 4 is a cross sectional view showing the manner in which the substrate of FIG. 3 and the other substrate are adhered to each other; and FIG. 5 is a cross sectional view showing the substrate of FIG. 3 and the other substrate adhered to each other.

DETAILED DESCRIPTION OF THE PREFERRED EMBODIMENTS

An embodiment of the present invention will now be described, with reference to the drawings.

Figure 1:
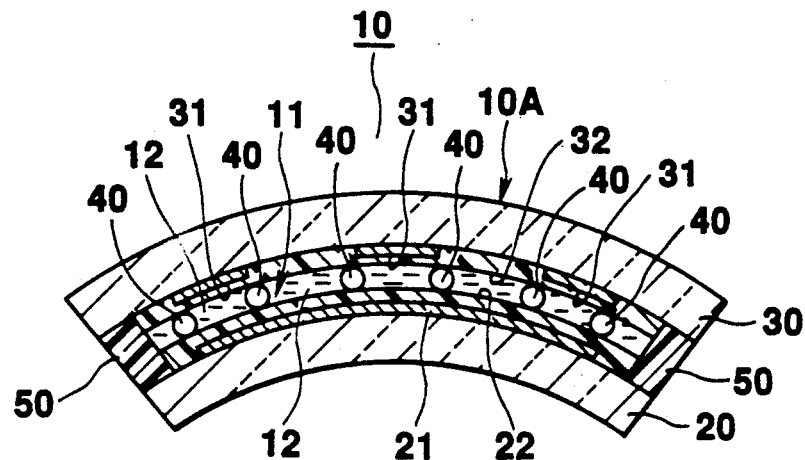

FIG. 1 shows a liquid crystal display panel 10 which is manufactured by a method according to one embodiment of the present invention. In the liquid crystal display panel 10, as shown in FIG. 1, a pair of transparent substrates 20 and 30 are arranged face to face, with a plurality of spacers 40 interposed therebetween. The display panel 10 has a curved shape, and a display surface 10A thereof gently curves outward. A liquid crystal storing space 11 is defined between the substrates 20 and 30, and is sealed by a sealing member 50 which is arranged on the peripheral edge portions of the substrates. Liquid crystal 12 is sealed in the liquid crystal storing space 11.

To be more specific, each of the substrates 20 and 30 are comprised of a flexible film having a thickness of 0.1 to 1.0 mm, and these films are formed of the same material, for example, a plastic material such as polyethyleneterephthalate, polyethersulfone, or polyimide. Transparent electrode patterns 21 and 31 which are made of ITO (indium tin oxide), for example, and orientation layers 22 and 32 which are made of plastic such as polyimide, are formed each on a corresponding one of the surfaces of the substrates 20 and 30 which face each other.

Spacers 40, arranged on that surface of the substrate 20 which faces the substrate 30, are used to keep the gap (the liquid crystal storing space 11) between the substrates 20 and 30 uniform. Each of the spacers 40 is constituted by a very small spherical or columnar member made of glass, or plastic, or the like, and which may be coated with an adhesive agent (not shown) if necessary.

Before the substrates 20 and 30 are bonded to each other by means of a sealing member 50, the substrate 20 is placed in an expanding state by a thermal expansion process wherein it is heated and then cooled. Thereafter, the expanded substrate 20 and the substrate 30, which has not been subjected to the above process, are adhered to each other.

Then, the sealing member 50 is hardened to bond the substrates 20 and 30 to each other, thus obtaining a flat liquid crystal cell having the liquid crystal storing space 11 defined between the substrates. The whole cell thus formed is subjected to the thermal expansion process wherein the cell is heated and then cooled, as a result of which the substrate 30, which has not been subjected to the thermal expansion process prior to adhesion, expands considerably, whereas the substrate 20, subjected to the thermal expansion process before adhesion, does not expand significantly. Thus, the substrates 20 and 30 are curved due to the difference between the mount of thermal expansion of the substrates. Accordingly, there can be provided a cell wherein the entire outer surface of the substrate 30, which serves as the display surface 10A, curves outward. After this, the liquid crystal 12 is sealed in the liquid crystal storing space 11.

According to the aforementioned liquid crystal display panel 10, the substrate 20 is subjected to thermal expansion before it and the substrate 30 are adhered face to face. After the substrates 20 and 30 are arranged face to face, the substrate 30 is subjected to thermal expansion such that the display surface 10A curves outward. In this way, a base member having a curved surface is not necessary, thus enabling the manufacturing cost to be reduced. Further, unlike in the case where the display surface is forcibly curved, the gap between the two substrates, 20 and 30, is uniform over the entire of the liquid crystal display panel 10, ensuring satisfactorily high display quality.

A method for manufacturing the liquid crystal display panel 10 will now be described in detail, with reference to FIGS. 2 to 5.

Figure 2:
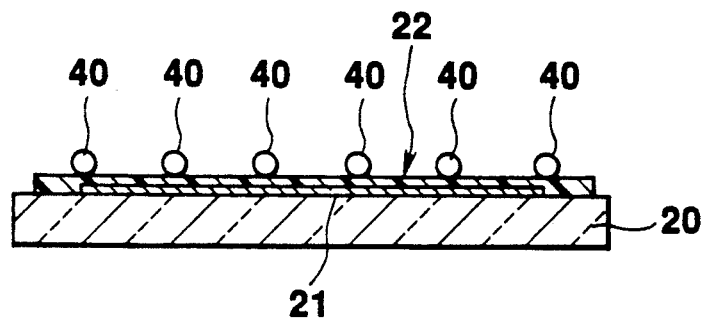
Figure 3:
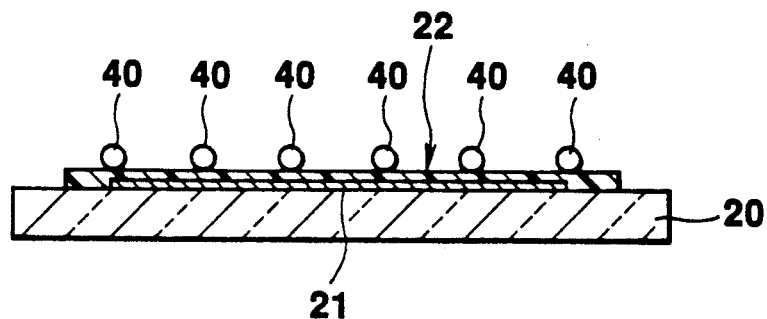

As shown in FIG. 2, the particle-like spacers 40 which are coated with an adhesive agent according to the need, are arranged by means of a spray method or the like on that surface of the substrate 20 which faces the substrate 30 and on which the transparent electrode pattern 21 and the orientation film 22 are formed. Then, as shown in FIG. 3, the substrate 20 is placed in an expanding state by a thermal expansion process, wherein it is heated in a clean oven or the like for 15 to 20 minutes at a temperature of 80° to 90° C., and thereafter is left to stand at room temperature, for example, thus cooling it gradually.

Figure 4:
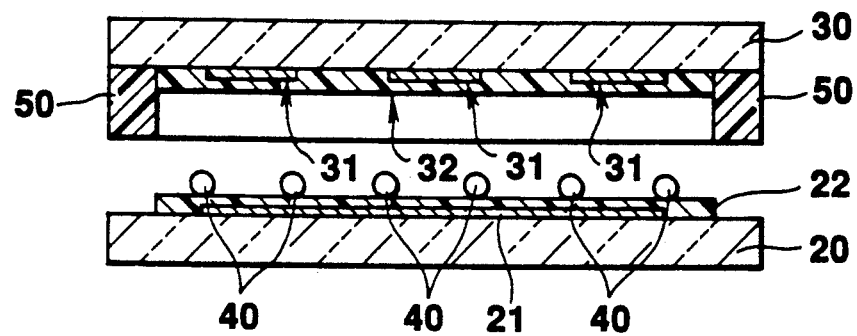

The sealing member 50 made of a thermosetting resin is arranged on the substrate 30, which has not been subjected to the thermal expansion process. The sealing member 50 is located on the peripheral region of that surface of the substrate 30 which faces the substrate 20 and on which the transparent electrode pattern 31 and the orientation film 32 are formed. As shown in FIG. 4, the substrates 20 and 30 are positioned facing each other, and with the sealing member 50 interposed therebetween.

Figure 5:
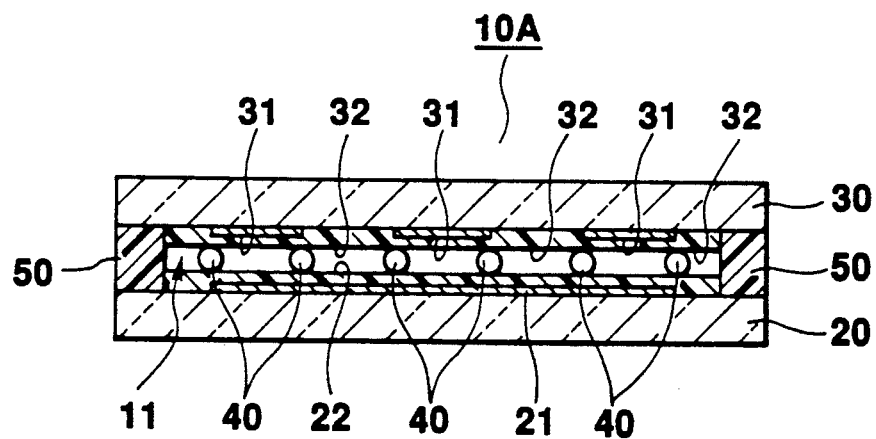

Then, the substrates 20 and 30 are subjected to a pressure of 400 to 500 g/cm$^2$, thus being bonded to each other to form a flat liquid crystal cell, as shown in FIG. 5. The cell thus formed is heated for 1.5 to 2 hours at a temperature of 140° to 150° C., as a result of which the sealing member 50 hardens, and the substrate 30, which has not been subjected to the thermal expansion process prior to adhesion, expands considerably, whereas the substrate 20, subjected to the thermal expansion process before adhesion, does not expand significantly, with the result that the entire cell is curved and the outer surface of the substrate 30, which serves as the display surface 10A, curves outward. After this, the liquid crystal cell is left to stand at room temperature, for example, thus cooling it gradually.

The liquid crystal storing space 11, sealed by the sealing member 50, is defined between the substrates 20 and 30 of the liquid crystal cell formed as above. In a part of the sealing member 11 is formed a liquid crystal filling hole (not shown), through which liquid crystal is supplied into the liquid crystal storing space 11.

After supplying liquid crystal 12 into the space 11 through the liquid crystal filling hole, the hole is sealed by a sealing member. In this manner, the liquid crystal display panel shown in FIG. 1 and having a display surface 10A which gently curves outward, is obtained.

According to the liquid crystal device manufacturing method of this embodiment, the substrate 20 is subjected to thermal expansion, and thereafter this substrate and the substrate 30, which has not been subjected to the thermal expansion process, are adhered face to face. Then, the substrate 30 is subjected to thermal expansion such that the entire cell and the display surface 10A curve outward. Employing this method, the liquid crystal display panel 10 can be manufactured without the need for a base member having a curved surface, thus enabling the manufacturing cost to be reduced, and such that the gap between the substrates 20 and 30 is uniform over the entirety of the liquid display panel 10, thus ensuring high display quality, unlike in the case of a conventional method wherein a flat liquid crystal cell is forcibly curved to provide a curved display surface.

In the above embodiment, the substrate 20 on which the spacers 40 are arranged is subjected to the thermal expansion process prior to adhesion. However, the present invention is not limited thereto, and instead of the substrate 20, the other substrate 30 may be subjected to the thermal expansion process prior to adhesion. Further, the display surface is not limited to an outwardly rounded surface, and may be curved inward. Further, in the above embodiment, the substrate 30 is subjected to thermal expansion before liquid crystal is supplied into the liquid crystal storing space 11. However, the substrate 30 can be subjected to thermal expansion after supply of liquid crystal.

Moreover, the sealing member 50 need not be formed by using a thermosetting resin; instead, a photo-setting resin can be used to form it. In this case, when the substrates 20 and 30 are adhered to each other, the sealing member 50 is irradiated with light such that it hardens, and then the thermal expansion process is performed. In addition, the substrates 20 and 30 may be formed of different materials.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A method for manufacturing a liquid crystal display panel, comprising the step of:
   preparing first and second plastic substrates;
   subjecting the first substrate to thermal expansion to produce a thermally expanded first substrate, arranging a sealing member on a peripheral portion of at least one of the first and second substrates, and adhering the thermally expanded first substrate and the second substrate to each other, with the sealing member interposed between the first and second substrates, to thereby define a space between portions of the first and second substrates; then
   subjecting the second substrate to thermal expansion so that the thermally expanded first substrate and the second substrate, which are adhered to each other, are curved; and then providing liquid crystal in the space between the first and second substrates.

2. A method according to claim 1, which further comprises a step of arranging a plurality of spacers on the first substrate.

3. A method according to claim 1, wherein the sealing member is arranged on the second substrate.

4. A method according to claim 1, wherein the step of subjecting the first substrate to thermal expansion includes heating the first substrate for 15 to 20 minutes at a temperature of 80° to 90° C.

5. A method according to claim 1, wherein the step of subjecting the second substrate to thermal expansion includes heating at least the second substrate for 1.5 to 2 hours at a temperature of 140° to 150° C.

6. A method according to claim 1, wherein at least one of the first and second substrates is made of any one of polyethyleneterephthalate, polyethersulfone, and polyimide.

7. A method according to claim 1, wherein the sealing member is made of a thermosetting resin.

8. A method according to claim 1, wherein the sealing member is made of a photo-setting resin.

9. A method according to claim 1, wherein the step of providing liquid crystal between the first and second substrates is performed after the step of subjecting the second substrate to thermal expansion.

10. A method according to claim 9, which further comprises a step of arranging a plurality of spacers on the first substrate.

11. A method according to claim 9, wherein the sealing member is arranged on the second substrate.

12. A method according to claim 9, wherein the step of subjecting the first substrate to thermal expansion includes heating the first substrate for 15 to 20 minutes at a temperature of 80° to 90° C.

13. A method according to claim 9, wherein the step of subjecting the second substrate to thermal expansion includes heating at least the second substrate for 1.5 to 2 hours at a temperature of 140° to 150° C.

14. A method according to claim 9, wherein at least one of the first and second substrates is made of any one of polyethyleneterephthalate, polyethersulfone, and polyimide.

15. A method according to claim 9, wherein the sealing member is made of a thermosetting resin.

16. A method according to claim 9, wherein the sealing member is made of a photo-setting resin.

17. A method for manufacturing a liquid crystal display panel, comprising the steps of:

preparing a first plastic substrate;

heating the first substrate to thermally expand the first substrate and then cooling the first substrate, thereby obtaining a thermally expanded first substrate; then preparing a second plastic substrate and adhering the thermally expanded first substrate and the second substrate to each other, with a sealing member interposed between the first and second substrates, to thereby define a space between portions of the first and second substrates; then heating the first and second substrates, which are adhered to each other, so as to subject the second substrate to thermal expansion, thereby curving the adhered together first and second substrates; and providing liquid crystal in the space between the first and second substrates.

18. A method according to claim 17, wherein the step of heating the first substrate includes heating the first substrate for 15 to 20 minutes at a temperature of 80° to 90° C.

19. A method according to claim 17, wherein the step of heating the adhered together first and second substrates includes heating the adhered together first and second substrates for 1.5 to 2 hours at a temperature of 140° to 150° C.

20. A method according to claim 17, wherein at least one of the first and second substrates is made of any one of polyethyleneterephthalate, polyethersulfone, and polyimide.

21. A method according to claim 1, wherein said first plastic substrate is made of a plastic material which, after being subjected to said thermal expansion to produce the thermally expanded first substrate, does not undergo any substantial further thermal expansion during the step of subjecting the second substrate to thermal expansion.

22. A method according to claim 1, wherein the step of subjecting the second substrate to thermal expansion includes heating both the thermally expanded first substrate and the second substrate so as to cause the second substrate to thermally expand without causing any substantial further thermal expansion of the thermally expanded first substrate.

23. A method according to claim 17, wherein said first plastic substrate is made of a plastic material which, after being heated to produce the thermally expanded first substrate does not undergo any substantial further thermal expansion during the step of heating the adhered together first and second substrates.

* * * * *